ns Patent [19]

Reinink

[11] 3,917,694
[45] Nov. 4, 1975

[54] CHLORINATION OF 3-OXOALKANAMIDES
[75] Inventor: Arend Reinink, Amsterdam, Netherlands
[73] Assignee: Shell Oil Company, Houston, Tex.
[22] Filed: Apr. 12, 1974
[21] Appl. No.: 460,312

[52] U.S. Cl.... 260/561 K; 260/561 R; 260/561 HL; 260/660
[51] Int. Cl.² .......................................... C07C 103/34
[58] Field of Search .......... 260/561 K, 561 HL, 660

[56] References Cited
UNITED STATES PATENTS

| | | | |
|---|---|---|---|
| 3,284,500 | 11/1966 | Tieman | 260/561 K |
| 3,449,421 | 6/1969 | Pearson | 260/561 K |
| 3,483,252 | 12/1969 | Beriger | 260/561 K |
| 3,852,351 | 12/1974 | Scharpf | 260/561 K |

Primary Examiner—C. Davis

[57] ABSTRACT

Selectivity of mono-chlorination of 3-oxoalkanamides is increased by initially limiting the amount of chlorine relative to the alkanamide and increasing the relative amount of chlorine as the chlorination progresses.

8 Claims, No Drawings

CHLORINATION OF 3-OXOALKANAMIDES

BACKGROUND OF THE INVENTION

Dialkyl 1-methyl-2-(mono-and dialkylcarbamoyl)vinyl phosphates are an economically important class of pesticides: U.S. Pat. Nos. 2,802,855 and 3,258,394. They and 1-alkyl analogs are customarily prepared by the reaction of trialkyl phosphites with 2-chloro-N,N-dialkyl (or N- alkyl) acetoacetamides (or the corresponding 3-alkyl-3-oxoalkanamides), respectively.

It is very important that these 3-oxoalkanamides be free, or substantially free, of the corresponding 2,2-dichloro analogs. These analogs also react with trialkyl phosphites to give the corresponding dialkyl 1-alkyl-2-chloro-2-(mono- and di-alkylcarbamoyl)vinyl phosphates. The latter are undesirable contaminants for they are inferior pesticides and are more toxic to mammals then their chlorine-free counterparts. Consequently, it is very important that as little as possible of the dichloroalkanamide be formed during the chlorination. The goal is thus to achieve high selectivity to the mono-chloro analog, and also if possible at the same time, to effect high conversion of the alkanamide to the mono-chloro analog. By "selectivity to the mono-chloro analog" is here meant the molar percentage of the mono-chloro analog obtained from that part of the 3-oxoalkanamide which is converted to other materials during the chlorination.

According to Netherlands Pat. application No. 70,14636, the alkanamide can be converted at high levels with high selectivity to the mono-chloro product by treating the alkanamide in a lower alkanol solvent containing water with chlorine at a temperature of the range of about −35°C to 15°C. Applicant has found, however, that in many cases, the conversion and selectivity levels tend to fall as the scale of the reaction is increased.

DESCRIPTION OF THE INVENTION

It has been found that the conversion and selectivity of chlorination of an N-alkyl or N,N-dialkyl 3-oxoalkanamide to the 2-mono-chloro derivative are maintained at high levels by initially limiting the amount of chlorine charged to the reaction zone, relative to the alkanamide, then progressively increasing the rate at which the chlorine is charged as the reaction goes forward with not more than 1.1 moles of chlorine total being charged per mole of alkanamide.

The 3-oxoalkanamides to which this invention relates are described by the general formula:

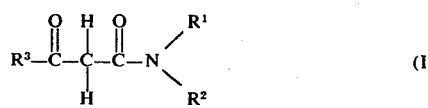

wherein $R^1$ and $R^3$ each is alkyl of 1 to 6 carbon atoms, particularly methyl, and $R^2$ is hydrogen or alkyl of 1 to 6 carbon atoms, particularly methyl.

It has been found that the levels of conversion of the alkanamide and the selectivity with respect to mono-chlorination are improved if the rate at which the chlorine is charged to the reaction zone is at first relatively low, then increased progressively as the reaction continues, as opposed to charging the chlorine at one essentially constant rate. That is to say, high conversions to the mono-chloro analog are obtained if the chlorine is introduced into the reaction zone initially at a lower rate and subsequently at a higher rate than the conversion and selectivity that would be obtained if the same total quantity of chlorine were to be introduced into the reaction zone at a constant rate for the same total length of time.

It has been found that the ratio between the rates at which the chlorine is introduced into the reaction zone at the end and at the beginning of chlorination influences the selectivity to the mono-chloro product and the conversion. The said selectivity and conversion are usually increased to a very satisfactory extent if the said ratio is greater than 2.0. This ratio has no critical upper limit; ratios of 20 or higher may be used. The course of the rate giving the greatest increase in the selectivity to the mono-chloro product may easily be determined for each individual case by means of experiments.

The rate at which chlorine is introduced may be increased continuously or step-wise or a combination of continuous and step-wise increases may be used. It may be increased in such a way that, as a function of the time, it is represented by, for example, a straight line, a parabola, a hyperbola, an e-curve or an other line or by a combination of two or more lines, for example, two straight lines or a straight line and a parabola.

The process according to the present invention may be carried out in the presence or absence of water. The presence of water increases the selectivity to the mono-chloro product and the conversion; it is recommended to use 5–40% by weight, and in particular, 10–25% by weight of water, based on alkanol. In this last case excellent selectivities and conversions are obtained if the ratio between the rate at which the chlorine is introduced into the reaction mixture at the end and at the beginning of chlorination is greater than 4. The concentration of the 3-oxoalkanamide precursor at the beginning of chlorination and the upper temperature limit are not critical. The said concentration preferably between 0.5 and 4 and most preferably between 0.75 and 1.50 moles/liter of solvent. The temperature is usually between −5°C and −30°C and depends to some extent on the water content of the alkanol. In general it may be said that with a higher water content a higher temperature may be maintained. With a water content between 10 and 25% by weight the recommended temperature may be between −5°C and −20°C.

If the molar ratios between the total quantities of chlorine to be used and the quantity of 3-oxoalkanamide precursor present at the beginning of the chlorination are higher than 1.1, the selectivity to the mono-chloro analog drops to values which are considered to be too low. The molar ratio will usually vary between 0.9 and 1.1 moles of chlorine per mole of 3-oxoalkanamide to be chlorinated, while molar ratios between 0.95 and 1.05 are preferred. Molar ratios below 0.9 moles of chlorine per mole of 3-oxoalkanamide are, however, admissible, but they result in correspondingly lower conversions.

Referring to Formula I, the contemplated 3-oxoalkanamides are those in which the moieties represented by $R^1$, $R^2$ and $R^3$ are identical or non-identical. Examples of 3-oxoalkanamides which may be used are those in which $R^1$, $R^2$ and $R^3$ each represent a methyl, ethyl, propyl, isopropyl, butyl, sec-butyl or tert-butyl group, as is for example, the case with N,N-dimethylacetoacetamide, N-methylacetoacetamide, N-propylacetoacetamide, N-methyl-N-ethylacetoacetamide, N,N-dibutylacetoacetamide, 3-oxo-N,N-dimethylhexanamide, 3-oxo-N,N-dimethyloctanamide and 3-oxo-5-methyl-N,N-dimethylhexanamide. Excellent results have been obtained with N-methylacetoacetamide. Mixtures of these 3-oxalkanamides are suitable.

The chlorination is carried out in the presence of a lower alkanol, examples of suitable alkanols being methanol, ethanol, propanol, isopropanol, 1-butanol, 2-butanol, isobutanol, 1-pentanol, 2-pentanol, 3-pentanol, 2-methyl-1-butanol, 2-methyl-3-butanol, 3-methyl-1-butanol, 2-methyl-2-butanol and all alkanols having 6 carbon atoms per molecule. Methanol is preferred since it is easy to remove by distillation when working up the 2-chloro-3-oxoalkanamide product. Mixtures of alkanols, for example of methanol and ethanol, may be used.

The present process may be carried out at superatmospheric, subatmospheric or atmospheric pressure. The pressure is not critical and may vary within wide limits.

The selectivity to the mono-chloro analog and the conversion may be increased sill further if the present process is carried out in the presence of a chlorination catalyst. Examples of chlorination catalysts are primary and secondary amines, amides, imides, urea and compounds derived therefrom, urethanes, thiourethanes, dithiocarbamates, thiocarbamates, thioamides, sulphoxamides, sulphoxamides, sulphonamides and isocyanurates. Urea is a very good chlorination catalyst. It has been found that the presence of a chlorination catalyst permits the use of higher temperatures than those which must be maintained in order to achieve the same selectivity to the mono-chloro analog in the presence of a chlorination catalyst. Excellent results are obtained in the presence of a chlorination catalyst at temperatures between −5°C and 15°C.

The mono-chloro product may be isolated from the resultant reaction mixture in a conventional manner. After completion of chlorination the hydrogen chloride formed may be neutralized by the addition of an alkaline-acting compound, for example aqueous ammonia, an amine, or an alkaline or alkaline earth metal carbonate or hydroxide. The alkanol is removed from the neutralized solution by distillation and if desired re-used for the present chlorination. The residue remaining after this distillation is subjected to extraction with an extractant suitable for extraction of the 2-chloro-3-oxoalkanamide, for example, chloroform, dichloromethane or an other chlorinated alkane during which process a raffinate is formed which contains water and salts, for example, ammonium chloride.

Practice of the invention is illustrated in the following experiments described in Example I. In these experiments the abbreviations MMAA and MMCAA refer to N-methylacetoacetamide and N-methyl-2-chloroacetoacetamide, respectively.

EXAMPLE 1

Experiment 1 was carried out as follows: 0.25 moles of chlorine at atmospheric pressure were introduced into 250 ml of methanol containing 12.5% by weight of water, based on methanol, and initially containing 0.25 moles of MMAA, during a period of 2.5 hours at a constant rate (2.4 liters/hour) with vigorous stirring. The temperature of the methanolic solution was maintained at −15°C by external cooling of the vessel containing the solution. The hydrogen chloride present in the solution was then neutralized by the addition of an aqueous ammonia solution, after which methanol was removed by distillation at subatmospheric pressure, the distillation residue was subjected to extraction with chloroform and the chloroform was flashed from the extract. The resultant residue was analysed by means of gas liquid chromatography.

Experiments 2–5 were carried out in the same manner as experiment 1; over a period of 2.5 hours 0.25 moles of chlorine were introduced, the only difference being that the chlorine supply rate was raised every fifteen minutes. Table A shows the chlorine supply rates for experiments 2–4, indicated by $v$ and expressed in N liters per hour, as a function of the time indicated by $t$ and expressed in hours. The rate is calculated for each 15 minute period as explained below for the first and last fifteen-minute periods of experiment 2. The value to be entered for $t$ is the time which has elapsed between the beginning of the experiment and the middle of the relevant 15 minute period. The rate in the first 15 minute period was $0.36 \times 0.125 + 1.95 = 2$ liters/hour and in the last 15 minute period it was $0.36 \times 2.375 + 1.95 = 2.80$ litres/hour; thus the ratio between the rates at the end and at the beginning of chlorination was 1.40. In experiment 5 the chlorine supply rates were as follows:

| time from beginning, hours | supply rate l/hour | time from beginning, hours | supply rate l/hour |
|---|---|---|---|
| 0.00–0.25 | 1.35 | 1.25–1.50 | 2.00 |
| 0.25–0.50 | 1.45 | 1.50–1.75 | 2.35 |
| 0.50–0.75 | 1.55 | 1.75–2.00 | 2.65 |
| 0.75–1.00 | 1.65 | 2.00–2.25 | 3.30 |
| 1.00–1.25 | 1.80 | 2.25–2.50 | 6.00 |

The conversion of the MMAA and the selectivity to MMCAA are shown in the fourth column from the left in Table A.

TABLE A

| Exp. No. | course of rate at which chlorine is introduced as a function of time | rate at end: rate at beginning | conversion of MMAA,%, 12.5% water | selectivity to MMCAA,/ mole %, 12.5% water | conversion of MMAA,%, 20% water | selectivity to MMCAA mole %, 20% water |
|---|---|---|---|---|---|---|
| 1(a) | $v=2.4$ | 1 | 93 | 86 | 90 | 92 |
| 2(a) | $v+0.36\,t + 1.95$ | 1.40 | 93 | 86 | 93 | 92 |
| 3(a) | $v=0.43\,t^2 + 1.5$ | 2.62 | 99 | 91 | 91 | 93 |
| 4(a) | $v=e^{0.623\,t}$ | 4.06 | 96 | 89 | 92 | 93 |

TABLE A-continued

| Exp. No. | course of rate at which chlorine is introduced as a function of time | rate at end: rate at beginning | conversion of MMAA,%, 12.5% water | selectivity to MMCAA,/ mole %, 12.5% water | conversion of MMAA,%, 20% water | selectivity to MMCAA mole %, 20% water |
|---|---|---|---|---|---|---|
| 5(a) | see above | 4.45 | 96 | 91 | 97 | 95 |

Experiments 1a–5a were carried out in the same manner as experiments 1–5, the only difference being that the methanol contained 20% by weight instead of 12.5% by weight of water. The conversion of the MMAA and the selectivity to MMCAA are shown in the first and second column from the right in Table A.

For comparison, a series of experiments were conducted wherein a constant flow of chlorine was charged into the reaction mixture. The results are presented in Example 2.

EXAMPLE 2

Experiment 1, see Table B, was carried out as follows: 0.05 moles of chlorine at atmospheric pressure were introduced into 25 ml of methanol containing 12.5% by weight of water, based on methanol, and 0.05 moles of MMAA, during a period of 15 minutes at a constant rate with vigorous stirring. The temperature of the reaction mixture was maintained at −15°C by external cooling of the vessel containing the methanolic solution. At the end of the said 15-minute period stirring was continued for a further 30 minutes, after which the hydrogen chloride present in the reaction mixture was neutralized by the addition of an aqueous sodium bicarbonate solution, the methanol was removed by evaporation at subatmospheric pressure and the evaporation residue was subjected to extraction with dichloromethane. The resultant extract was dried over sodium sulphate and analysed by means of GLC.

Experiments 2–11 were carried out in the same manner as experiment 1, the only difference being that in experiments 2 and 3 the temperatures shown in Table B were maintained and in the experiments 4–11 urea was used in the molar ratios and at the temperatures shown.

TABLE B

| Exp. No. | Temp. °C | Moles of Urea Per Mole of MMAA | Conversion of MMAA,% | Selectivity to MMCAA, mole% |
|---|---|---|---|---|
| 1 | −15 | 0 | 96 | 97 |
| 2 | −10 | 0 | 92 | 93 |
| 3 | 0 | 0 | 86 | 81 |
| 4 | −15 | 0.016 | 95 | 95 |
| 5 | −15 | 0.25 | 92 | 99 |
| 6 | −15 | 0.50 | 97 | 99 |
| 7 | −10 | 0.50 | 95 | 95 |
| 8 | 0 | 0.50 | 88 | 96 |
| 9* | 0 | 0.50 | 97 | 89 |
| 10 | −15 | 0.75 | 98 | 99 |

TABLE B-continued

| Exp. No. | Temp. °C | Moles of Urea Per Mole of MMAA | Conversion of MMAA,% | Selectivity to MMCAA, mole% |
|---|---|---|---|---|
| 11 | −15 | 1 | 99 | 98 |

*1.1 moles of chlorine per mole of MMAA

A comparison between experiments 3 and 8 (carried out at 0°C) between 1 and 11 (carried out at −15°C) and between 2 and 7 (carried out at −10°C) shows the increase in the selectivity to MMCAA and in the conversion when urea is used. It is expected that at 0°C in the presence of 1 mole of urea per mole of MMAA substantially the same selectivity to MMCAA and the same conversion will be obtained as at −15°C in the absence of urea and that even higher selectivities and conversions would be obtained if in experiments 4–11 the rate at which the chlorine was introduced into the methanolic solution were increased continuously or step-wise according to the invention.

I claim as my invention:

1. In a process for selectively chlorinating an N-alkyl- or N,N-dialkyl-3-oxoalkanamide to the corresponding 2-monochloro-3-oxoalkanamide by treating a mixture of the N-alkyl- or N,N-dialkyl-3 -oxoalkanamide, and a lower alkanol with chlorine, at a temperature of from about −35° C to about 15° C, the improvement which comprises initially limiting the rate at which the chlorine is charged to the reaction zone and thereafter progressively increasing the rate as the reaction proceeds, the initial rate at which the chlorine is charged to the reaction zone being at least about 0.04 mole per hour per mole of oxoalkanamide charged, and the ratio between the rates at which the chlorine is introduced into the reaction zone at the end and at the beginning of the chlorination being greater than 2.0.

2. A process according to claim 1 characterized in that the alkanol contains 5 to 40% by weight of water, based on alkanol.

3. A process according to claim 1 characterized in that methanol is used as the alkanol.

4. A process according to claim 1 characterized in that N-methylacetoacetamide is used as the 3-oxoalkanamide.

5. A process according to claim 1 characterized in that the temperature of the reaction mixture is maintained at a value between −5 and −30°C.

6. A process according to claim 1 characterized in that it is carried out in the presence of a chlorination catalyst.

7. A process according to claim 6 characterized in that urea is used as the chlorination catalyst.

8. A process according to claim 7 characterized in that the temperature of the alkanol is maintained at a value between +5°C and −5°C.

* * * * *